US012565106B2

(12) United States Patent
Kim et al.

(10) Patent No.: US 12,565,106 B2
(45) Date of Patent: Mar. 3, 2026

(54) FUEL CELL VEHICLE AND CONTROL METHOD OF VEHICLE

(71) Applicants: Hyundai Motor Company, Seoul (KR); Kia Corporation, Seoul (KR)

(72) Inventors: Joo Yeon Kim, Seoul (KR); Seong Cheol Jeong, Suwon-si (KR); Sung Do Kim, Seoul (KR); Chang Seok You, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 284 days.

(21) Appl. No.: 18/135,422

(22) Filed: Apr. 17, 2023

(65) Prior Publication Data

US 2024/0157803 A1 May 16, 2024

(30) Foreign Application Priority Data

Nov. 14, 2022 (KR) ........................ 10-2022-0151901

(51) Int. Cl.
| | |
|---|---|
| *B60L 7/10* | (2006.01) |
| *B60L 50/75* | (2019.01) |
| *H01M 8/04111* | (2016.01) |
| *H01M 8/04746* | (2016.01) |
| *H01M 8/04992* | (2016.01) |
| *H01M 16/00* | (2006.01) |

(52) U.S. Cl.
CPC ................ *B60L 7/10* (2013.01); *B60L 50/75* (2019.02); *H01M 8/04111* (2013.01); *H01M 8/04776* (2013.01); *H01M 8/04992* (2013.01); *H01M 16/006* (2013.01); *H01M 2250/20* (2013.01)

(58) Field of Classification Search
CPC ....... B60L 7/10; B60L 50/75; H01M 8/04111; H01M 8/04776; H01M 8/04992; H01M 16/006; H01M 2250/20
See application file for complete search history.

(56) References Cited

U.S. PATENT DOCUMENTS

| | | | |
|---|---|---|---|
| 2004/0265134 A1* | 12/2004 | Iimura | ................... F04B 49/06 417/44.1 |
| 2017/0297451 A1* | 10/2017 | Kim | ................. H01M 8/04552 |
| 2017/0305275 A1* | 10/2017 | You | ........................... B60L 7/18 |
| 2017/0309935 A1* | 10/2017 | Lee | ........................... B60L 1/20 |

FOREIGN PATENT DOCUMENTS

| | | | | |
|---|---|---|---|---|
| JP | 5381427 B2 * | 1/2014 | | |
| KR | 101491303 B1 * | 2/2015 | ........ | H01M 8/04395 |
| KR | 10-2020-0050492 A | 5/2020 | | |

OTHER PUBLICATIONS

JP5381427B2 machine translation (Year: 2014).*
KR101491303B1 machine translation (Year: 2015).*

* cited by examiner

*Primary Examiner* — Navid Z. Mehdizadeh
*Assistant Examiner* — Oliver Tan
(74) *Attorney, Agent, or Firm* — Morgan, Lewis & Bockius LLP

(57) ABSTRACT

A fuel cell vehicle includes a fuel cell stack and a battery; an air compressor that supplies air to the fuel cell stack and is able to generate power during regenerative braking; a drive motor that provides driving force to a vehicle and is able to generate power during the regenerative braking; and a controller that controls operation of the air compressor so that a sum of power generation of the fuel cell stack and power generation of the regenerative braking of the air compressor and drive motor is close to a chargeable amount of the battery.

10 Claims, 6 Drawing Sheets

Figure 3:
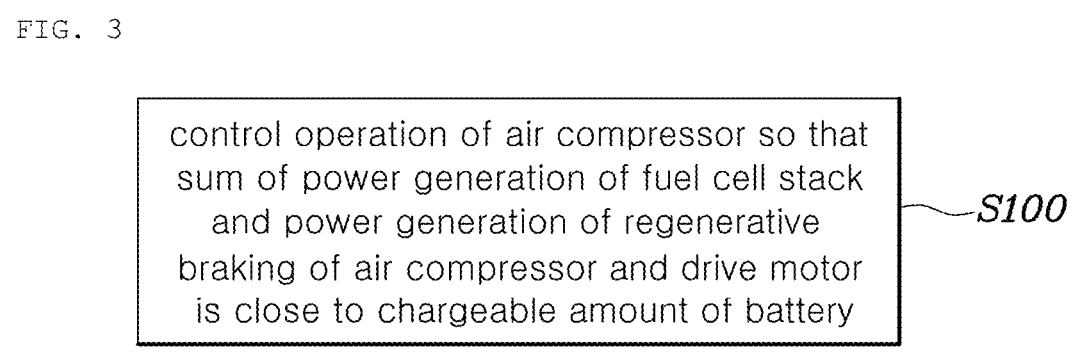

FIG. 3 control operation of air compressor so that
sum of power generation of fuel cell stack
and power generation of regenerative
braking of air compressor and drive motor
is close to chargeable amount of battery
— S100 calculate multiple index values existing between upper limit value and lower limit value where upper limit value is current speed of air compressor and lower limit value is maximum reduced speed after unit time —S110 select one of multiple index values as speed of air compressor —S120 control operation of air compressor 300 at selected speed of air compressor —S130

FIG. 5

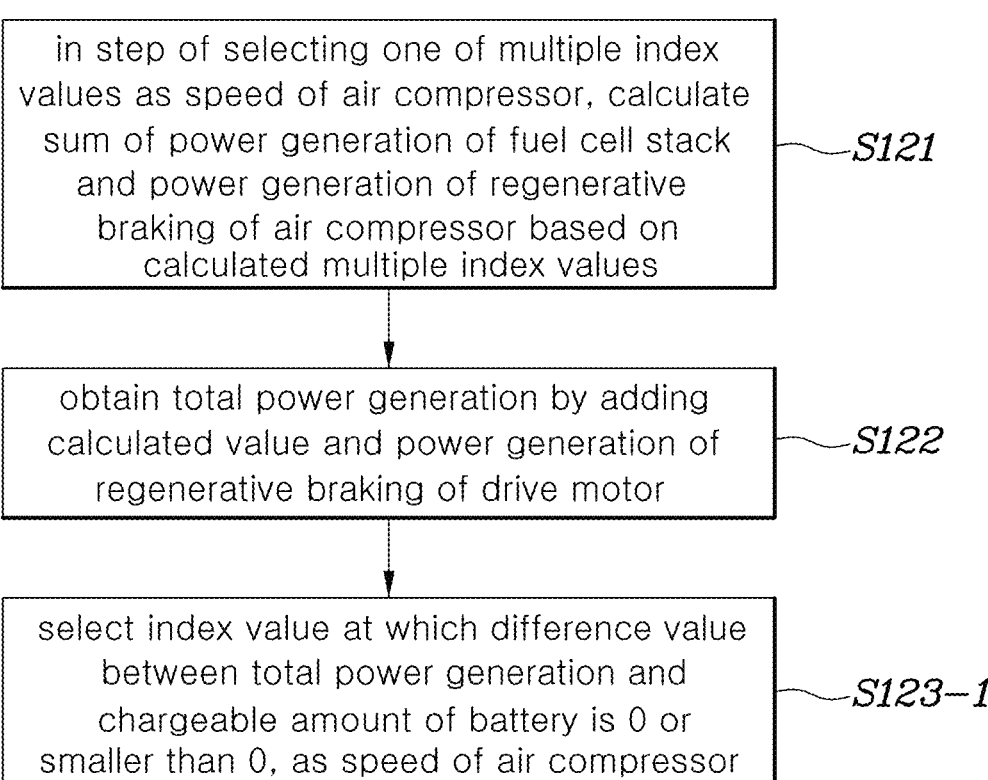

in step of selecting one of multiple index values as speed of air compressor, calculate sum of power generation of fuel cell stack and power generation of regenerative braking of air compressor based on calculated multiple index values  ⌐~S121 obtain total power generation by adding calculated value and power generation of regenerative braking of drive motor  ⌐~S122 select index value at which difference value between total power generation and chargeable amount of battery is 0 or smaller than 0, as speed of air compressor  ⌐~S123-1

FIG. 6

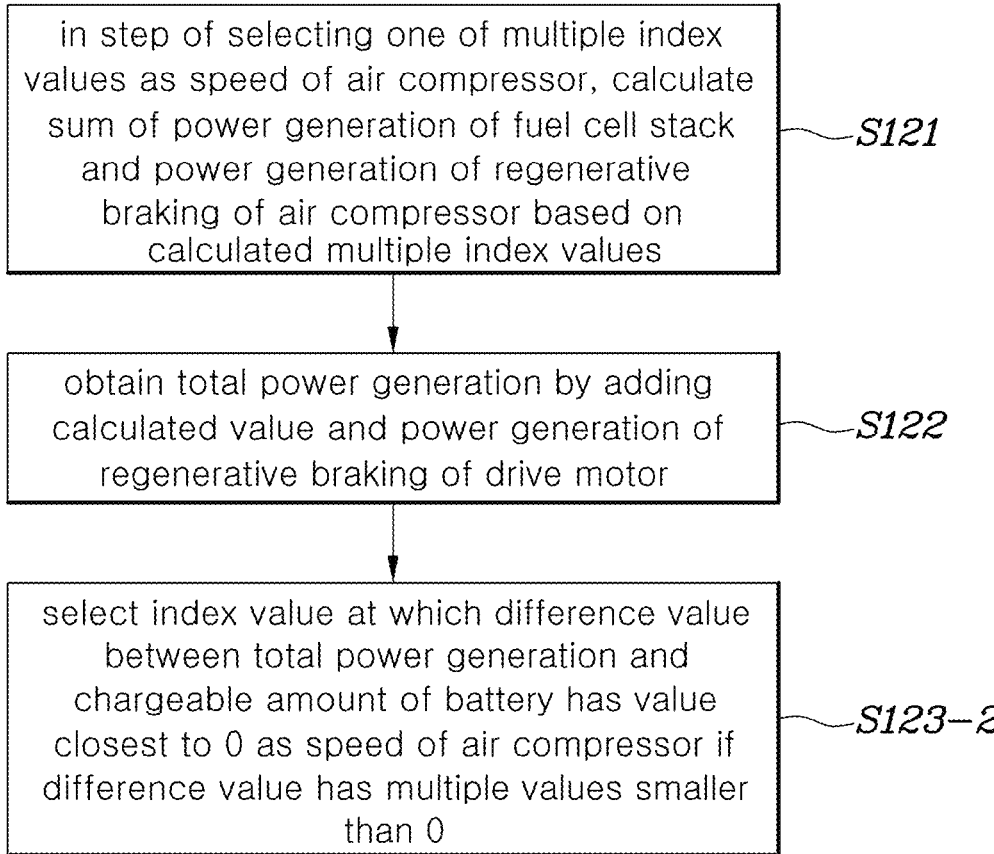

in step of selecting one of multiple index values as speed of air compressor, calculate sum of power generation of fuel cell stack and power generation of regenerative braking of air compressor based on calculated multiple index values — *S121* obtain total power generation by adding calculated value and power generation of regenerative braking of drive motor — *S122* select index value at which difference value between total power generation and chargeable amount of battery has value closest to 0 as speed of air compressor if difference value has multiple values smaller than 0 — *S123-2*

FUEL CELL VEHICLE AND CONTROL METHOD OF VEHICLE

CROSS REFERENCE TO RELATED APPLICATION

The present application claims priority to Korean Patent Application No. 10-2022-0151901 filed Nov. 14, 2022 in the Korean Intellectual Property Office, the entire contents of which is incorporated herein for all purposes by this reference.

TECHNICAL FIELD

The disclosure relates to a fuel cell vehicle and a control method of a fuel cell vehicle to determine the speed of an air compressor that supplies air to a cathode, and relates to a technology for determining the speed of an air compressor by calculating the amount of energy generated during braking of a fuel cell vehicle and the chargeable amount of a battery.

BACKGROUND

A fuel cell is a device that generates electrical energy through an electrochemical reaction inside a fuel cell stack by receiving hydrogen and air supplied from the outside, and may be used as a power source in various fields such as fuel cell vehicles (FCEVs) and fuel cells for power generation.

A fuel cell system includes a fuel cell stack in which a plurality of fuel cells used as a power source is stacked, a fuel supply system for supplying hydrogen as a fuel to the fuel cell stack, an air supply system for supplying oxygen as an oxidant required for an electrochemical reaction, a water and thermal management system for controlling the temperature of the fuel cell stack, and the like.

The fuel supply system depressurizes the compressed hydrogen inside a hydrogen tank and supplies it to an anode (a fuel electrode) of the fuel cell stack, and the air supply system operates an air compressor to supply the inhaled external air to a cathode (an air electrode) of the fuel cell stack.

When hydrogen is supplied to the anode and oxygen is supplied to the cathode in the fuel cell stack, hydrogen ions are separated from the anode through a catalytic reaction. The separated hydrogen ions are transferred to the anode, which is the air electrode, through an electrolyte membrane, and the hydrogen ions separated from the anode, electrons, and oxygen cause an electrochemical reaction at the anode, through which electrical energy can be obtained. Specifically, the electrochemical oxidation of hydrogen occurs at the anode, and the electrochemical reduction of oxygen occurs at the cathode, and electricity and heat are generated due to the movement of electrons generated at this time, and water vapor or water is generated by the chemical action of combining hydrogen and oxygen.

An exhaust device is provided to discharge the hydrogen and oxygen that are not reacted with by-products such as water vapor, water, and heat generated during the electrical energy generation process of the fuel cell stack, and gases such as water vapor, hydrogen and oxygen are discharged into the atmosphere through an exhaust passage.

The electrochemical reaction occurring inside the fuel cell is represented by the reaction formulas as follows.

[Reaction at the anode] $2H_2(g) \rightarrow 4H^+ (aq.) + 4e^-$
[Reaction at the cathode] $O_2(g) + 4H^+ (aq.) + 4e^- \rightarrow 2H_2O$ (1)
[Overall reaction] $2H_2(g) + O_2(g) \rightarrow 2H_2O$ (1) + electrical energy + heat energy As represented in the above reaction formulas, a hydrogen molecule is dissociated into four hydrogen ions and four electrons at the anode. The electrons move through an external circuit to generate a current (electrical energy), and the hydrogen ions move to the cathode through the electrolyte membrane to perform a reduction electrode reaction, so that water and heat are generated as by-products of the electrochemical reaction.

Meanwhile, the efficiency of the fuel cell vehicle may be increased by recovering power through regenerative braking of a drive motor and air compressor of the fuel cell vehicle during braking of the fuel cell vehicle and using the recovered power where necessary.

That is, during braking of the fuel cell vehicle, energy is generated according to the power generation of the regenerative braking of the drive motor and air compressor and the power generation of the fuel cell stack, and is recovered by the battery.

However, in recent years, in order to determine the speed of the air compressor during braking of the fuel cell vehicle, i) a target current for generating a target output of the fuel cell stack is calculated, ii) the flow rate of air corresponding to the target current is calculated, and iii) the speed of the air compressor for supplying the air flow rate is calculated, so that the energy due to the regenerative braking of the air compressor is not considered.

In this case, in the regenerative braking situation, the actual speed of the air compressor is lower than the target speed of the air compressor, so there is a high possibility of generating an error in the amount of energy generated. In addition, since the speed of the air compressor is determined without considering the amount of energy available for regenerative braking, overvoltage may occur at the main bus terminal of the fuel cell vehicle or the recovery rate of regenerative braking energy may deteriorate depending on circumstances.

The foregoing explained as the background is intended merely to aid in the understanding of the background of the present disclosure, and is not intended to mean that the present disclosure falls within the purview of the related art that is already known to those skilled in the art.

SUMMARY

The disclosure has been proposed to solve these problems, and provides a fuel cell vehicle capable of improving fuel efficiency by preventing a high voltage from being generated at the main bus terminal during braking of the fuel cell vehicle, thereby increasing the durability of the fuel cell vehicle and at the same time enabling appropriate recovery of regenerative braking energy, and a control method of the fuel cell vehicle.

In order to achieve the above objects, a fuel cell vehicle according to the disclosure includes a fuel cell stack and a battery; an air compressor that supplies air to the fuel cell stack and generates power during regenerative braking; a drive motor that provides driving force to the fuel cell vehicle and generates power during the regenerative braking; and a controller that controls operation of the air compressor so that a sum of power generation of the fuel cell stack and power generation of the regenerative braking of the air compressor and drive motor is close to a chargeable amount of the battery.

The controller may control the operation of the air compressor by calculating a target speed of the air compressor so that the sum of the power generation of the fuel cell stack and the power generation of the regenerative braking of the air compressor and drive motor is close to the chargeable amount of the battery.

The controller may calculate the target speed of the air compressor so that the sum of the power generation of the fuel cell stack and the power generation of the regenerative braking of the air compressor and drive motor is less than or equal to the chargeable amount of the battery.

The controller may set a current speed of the air compressor as an upper limit value, set a maximum reduced speed after unit time as a lower limit value, calculate multiple index values that exist between the upper limit value and the lower limit value, and select one of the multiple index values as a speed of the air compressor to control the operation of the air compressor.

The controller may calculate the multiple index values that exist between the upper limit value and the lower limit value, calculates values by summing the power generation of the fuel cell stack and the power generation of the regenerative braking of the air compressor based on the multiple index values, each of the calculated values corresponding to each of the multiple index values, obtain each total power generation by adding the each of the calculated values and the power generation of the regenerative braking of the drive motor, calculate a difference value between each total power generation and the chargeable amount of the battery, and select an index value at which the difference value among the calculated difference values has a value smaller than 0 and closest to 0 as the speed of the air compressor to control the operation of the air compressor.

The controller may control the operation of the air compressor by selecting one of the multiple index values including the upper limit value and the lower limit value as the speed of the air compressor.

The controller may correct the selected speed of the air compressor if a difference value between the selected speed of the air compressor and a current speed of the air compressor exceeds a predetermined value.

The controller may correct the selected speed of the air compressor so that the selected speed of the air compressor is close to the current speed of the air compressor if the difference value between the selected speed of the air compressor and the current speed of the air compressor exceeds the predetermined value.

The controller may calculate the sum of the power generation of the fuel cell stack and the power generation of the regenerative braking of the air compressor based on the calculated multiple index values, and add the calculated value and the power generation of the regenerative braking of the drive motor to obtain total power generation, and select the index value at which a difference value between the total power generation and the chargeable amount of the battery is 0 or smaller than 0 as the speed of the air compressor to control the operation of the air compressor.

If the difference value between the total power generation and the chargeable amount of the battery has multiple values smaller than 0, the controller selects the index value at which the difference value between the total power generation and the chargeable amount of the battery has a value closest to 0 as the speed of the air compressor to control the operation of the air compressor.

The controller may control the operation of the air compressor so that the difference value between the sum of the power generation of the fuel cell stack and the power generation of the regenerative braking of the air compressor and drive motor and the chargeable amount of the battery is smaller than 0.

A method for controlling the fuel cell vehicle of claim includes the step of controlling the operation of the air compressor by the controller so that the sum of the power generation of the fuel cell stack and the power generation of the regenerative braking of the air compressor and drive motor is close to the chargeable amount of the battery.

The step of controlling the operation of the air compressor by the controller may include the steps of calculating multiple index values existing an upper limit value and a lower limit value wherein the upper limit value is a current speed of the air compressor, and the lower limit value is a maximum reduced speed after unit time; selecting one of the multiple index values as a speed of the air compressor; and controlling the operation of the air compressor at the selected speed of the air compressor.

The step of selecting one of the multiple index values as the speed of the air compressor may include the steps of calculating the sum of the power generation of the fuel cell stack and the power generation of the regenerative braking of the air compressor based on the calculated multiple index values; obtaining total power generation by adding the calculated value and the power generation of the regenerative braking of the drive motor; and selecting the index value at which a difference value between the total power generation and the chargeable amount of the battery is 0 or smaller than 0 as the speed of the air compressor.

The step of selecting one of the multiple index values as the speed of the air compressor may include the steps of calculating the sum of the power generation of the fuel cell stack and the power generation of the regenerative braking of the air compressor based on the calculated multiple index values; obtaining total power generation by adding the calculated value and the power generation of the regenerative braking of the drive motor; and selecting the index value at which a difference value between the total power generation and the chargeable amount of the battery is closest to 0 as the speed of the air compressor if the difference value has multiple values smaller than 0.

According to the fuel cell vehicle and the control method of the fuel cell vehicle of the disclosure, high voltage is not generated at the main bus terminal during braking of the fuel cell vehicle, thereby increasing durability of the fuel cell vehicle and at the same time, enabling appropriate recover of regenerative braking energy, so that the fuel efficiency of fuel cell vehicles can also be improved.

BRIEF DESCRIPTION OF THE DRAWINGS

FIGS. 3 to 5 are flowcharts of a control method of a fuel cell vehicle according to an embodiment of the disclosure.

FIG. 6 is a flowchart of a control method of a fuel cell vehicle according to another embodiment of the disclosure.

DETAILED DESCRIPTION

Figure 1:
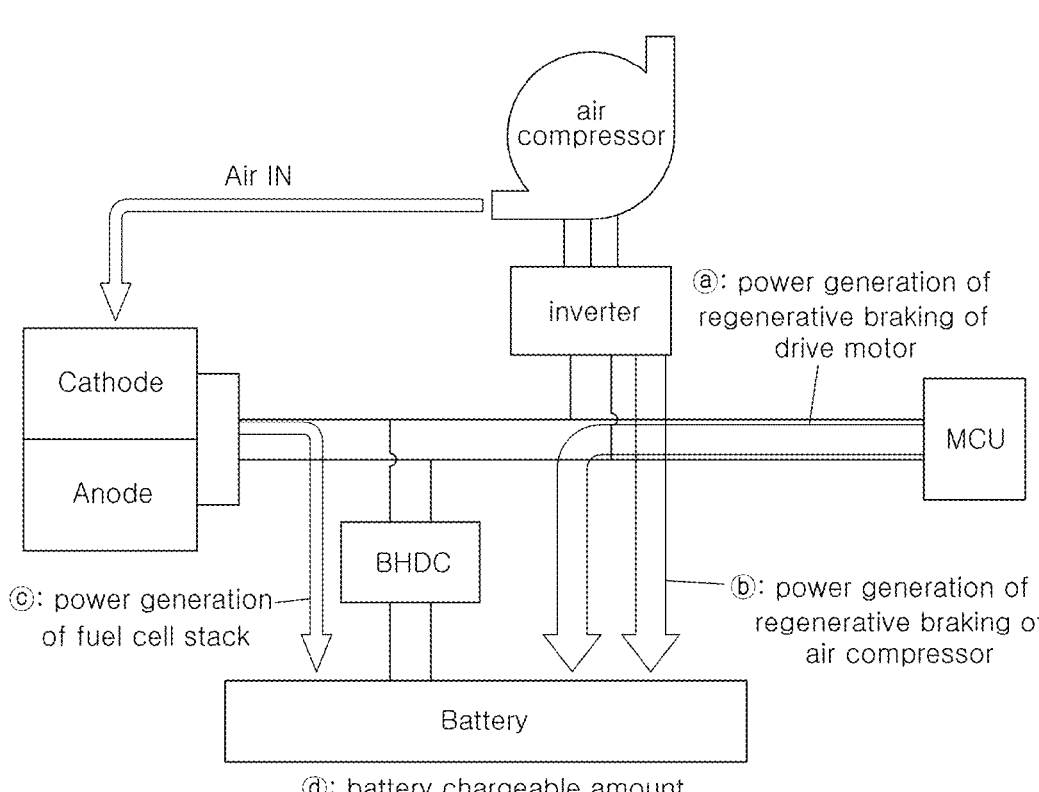
FIG. 1 is a schematic diagram of energy flow upon braking of a fuel cell vehicle.

Hereinafter, the embodiments disclosed in this specification will be described in detail with reference to the accompanying drawings, but the same reference numerals will be assigned to the same or similar components regardless of reference numerals, and overlapping descriptions thereof will be omitted.

In describing embodiments disclosed in this specification, a detailed description of relevant well-known technologies may not be given in order not to obscure the subject matter of the present disclosure. In addition, the accompanying drawings are merely intended to facilitate understanding of the embodiments disclosed in this specification and not to restrict the technical spirit of the present disclosure. In addition, the accompanying drawings should be understood as covering all changes, equivalents or substitutions within the sprit and scope of the present Disclosure.

Terms including ordinal numbers such as first, second, etc. may be used to explain various elements. However, it will be appreciated that the elements are not limited to such terms. These terms are merely used to distinguish one element from another.

A singular expression includes a plural expression unless the two expressions are contextually different from each other.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

FIG. 1 is a schematic diagram of energy flow during braking of a fuel cell vehicle. Referring to FIG. 1, as the power recovered to a battery during braking of the fuel cell vehicle, there are ⓐ the power by regenerative braking of a drive motor, ⓑ the power by regenerative braking of an air compressor, and ⓒ the power generated by a reaction between air and hydrogen flowing into a fuel cell stack by the speed change of the air compressor.

Specifically, the power by the regenerative braking of the drive motor can be obtained through operation of a motor controller (MCU), and the power by the regenerative braking of the air compressor and the power generated by the fuel cell stack can be obtained from the speed change of the air compressor.

Meanwhile, during the regenerative braking of the fuel cell vehicle, the battery management system (BMS) of the fuel cell vehicle calculates the power generation that the battery can receive according to the current state of charge (SOC) and sets ⓓ battery chargeable amount so that excessive power does not flow into the battery.

The ⓓ battery chargeable amount is ideally set to the sum (total power generation) of ⓐ the power by regenerative braking of the drive motor, ⓑ the power by regenerative braking of the air compressor, and ⓒ the power generated by the reaction between air and hydrogen flowing into the fuel cell stack by the speed change of the air compressor.

Therefore, an object of the disclosure is to determine a driving speed of the air compressor for appropriately adjusting ⓑ the power by regenerative braking of the air compressor and ⓒ the power generated by the reaction between air and hydrogen flowing into the fuel cell stack by the speed change of the air compressor in consideration of ⓓ the battery chargeable amount.

Figure 2:
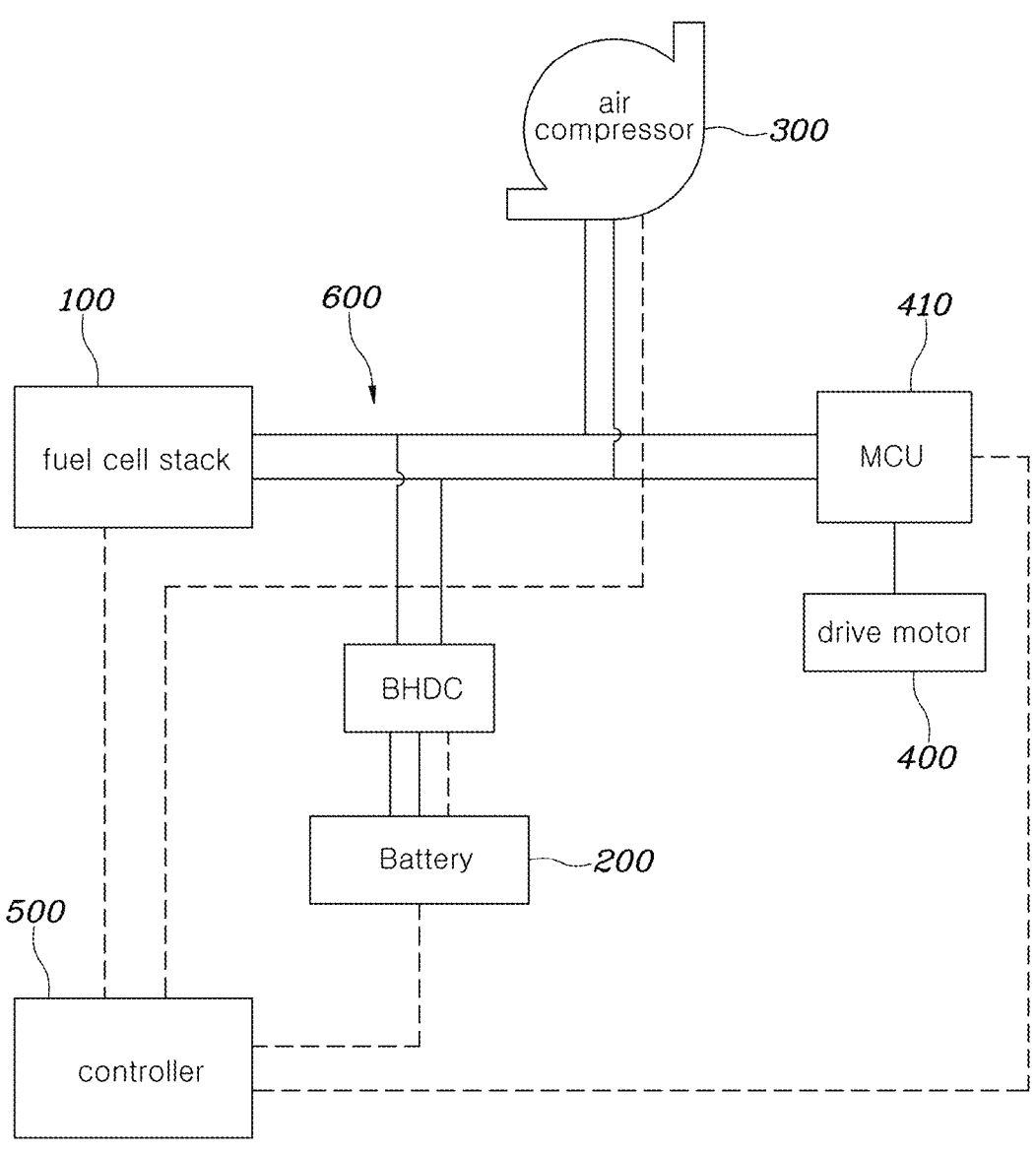
FIG. 2 is a schematic diagram of a system of a fuel cell vehicle according to an embodiment of the disclosure.

FIG. 2 is a schematic diagram of a system of a fuel cell vehicle according to an embodiment of the disclosure. A fuel cell vehicle according to the disclosure for achieving the above object includes a fuel cell stack 100, a battery 200, an air compressor 300 that supplies air to the fuel cell stack 100 and can generate power during regenerative braking, a drive motor 400 that provides driving force to the vehicle and can generate power during regenerative braking; and a controller 500 for controlling the operation of the air compressor 300 so that the sum of the power generation of the fuel cell stack 100 and the power generation of the regenerative braking of the air compressor 300 and drive motor 400 is close to the chargeable amount of the battery 200.

The controller 500 calculates an appropriate speed of the air compressor 300 when the fuel cell vehicle enters braking, and the process is as follows. During braking of the fuel cell vehicle, the speed of the air compressor 300 to be targeted is determined, and the power generation of the fuel cell stack 100 and the power generation of the regenerative braking of the air compressor 300 are calculated based on the determined speed of the air compressor 300, and the calculated result is summed with the power generation of the regenerative braking of the drive motor 400 determined by a motor controller (MCU) 410 and compared with the chargeable amount of the battery 200 to determine whether the summed result is close to the chargeable amount.

The controller 500 determines that the sum of the power generation of the fuel cell stack 100 and the power generation of the regenerative braking of the air compressor 300 and drive motor 400 is close to the chargeable amount of the battery if the absolute value of the difference value between the sum and the chargeable amount of the battery 200 is less than or equal to a threshold value, and can operate the air compressor at the determined speed of the air compressor 300.

That is, the speed of the air compressor 300 can be determined by Equation 1 below so that the absolute value of ⓐ+ⓑ+ⓒ−ⓓ is lower than a threshold value.

$$|a+b+c+d| \le \text{threshold value} \qquad \text{[Equation 1]}$$

ⓐ: regenerative braking amount of a drive motor
ⓑ: regenerative braking amount of an air compressor
ⓒ: power generation of a fuel cell stack
ⓓ: battery chargeable amount If the absolute value of the difference value between the sum of the power generation of the fuel cell stack 100 and the power generation of the regenerative braking of the air compressor 300 and drive motor 400, and the chargeable amount of the battery 200 exceeds a threshold value, the speed of the air compressor 300 is again determined.

In addition, the controller 500 feedback-controls the air compressor 300 so that the sum of the power generation of the fuel cell stack 100 and the power generation of the regenerative braking of the air compressor 300 and drive motor 400 follows the chargeable amount of the battery 200. By doing so, the controller 500 causes the sum of the power generation of the fuel cell stack 100 and the power generation of the regenerative braking of the air compressor 300 and drive motor 400 to approach the chargeable amount of the battery 200.

On the other hand, the controller may include a communication device that communicates with other controllers or sensors to control functions in charge, a memory that stores operating system, logic commands, input/output information, and the like, and one or more processors that perform determination, calculations, and decisions necessary to control functions in charge. The terms "unit" and "controller" forming part of the names of the motor controller (MCU) and the hybrid controller (HCU) are merely terms that are widely used in the naming of a controller for controlling a specific function of a vehicle, and should not be construed as meaning a generic function unit.

According to an exemplary embodiment of the present disclosure, the controller may include a processor (e.g., computer, microprocessor, CPU, ASIC, circuitry, logic circuits, etc.) and an associated non-transitory memory storing software instructions which, when executed by the processor, provides the functionalities of the controller. Herein, the memory and the processor may be implemented as separate semiconductor circuits. Alternatively, the memory and the processor may be implemented as a single integrated semiconductor circuit. The processor may embody one or more processor(s).

Meanwhile, the controller 500 may control the operation of the air compressor 300 by calculating the target speed of the air compressor 300 so that the sum of the power generation of the fuel cell stack 100 and the power generation of the regenerative braking of the air compressor 300 and drive motor 400 is close to the chargeable amount of the battery 200.

Specifically, the calculation method of the target speed of the air compressor 300 so that the sum of the power generation of the fuel cell stack 100 and the power generation of the regenerative braking of the air compressor 300 and drive motor 400 is close to the chargeable amount of the battery 200 is as follows.

①a difference value ⓔ between the result obtained by multiplying the maximum speed reduction of the air compressor 300, which is physically determined, and unit time of the air compressor 300, and the current speed of the air compressor 300 is determined (where, the unit time is the time required for communication and control of the air compressor)

②n values are arbitrarily selected among the values between the current speed of the air compressor 300 and the difference value ⓔ.

③Any one of the n values selected arbitrarily is selected and set as the speed of the air compressor 300, and it is determined whether the sum (total power generation) of the power generation of the fuel cell stack 100 and the power generation of the regenerative braking of the air compressor 300 and drive motor 400 is close to the chargeable amount of the battery 200.

(furthermore, one of the n+2 values, including an upper limit value and a lower limit value, as well as the n values, is selected, and set as the speed of the air compressor, and it may be determined whether the corresponding sum (total power generation) of the power generation of the fuel cell stack and the power generation of the regenerative braking of the air compressor and drive motor is close to the chargeable amount of the battery)

④If the absolute value of the difference value between the sum (total power generation) of the power generation of the fuel cell stack 100 and the power generation of the regenerative braking of the air compressor 300 and drive motor 400, and the chargeable amount of the battery 200 is less than or equal to a threshold value, a predetermined value is determined as the speed of the air compressor 300 and the air compressor 300 is controlled.

⑤If the absolute value of the difference value between the sum (total power generation) of the power generation of the fuel cell stack 100 and the power generation of the regenerative braking of the air compressor 300 and drive motor 400, and the chargeable amount of the battery 200 exceeds a threshold value, another value among the n values is selected and the above process is repeated.

Meanwhile, the controller 500 may calculate the target speed of the air compressor 300 so that the sum of the power generation of the fuel cell stack 100 and the power generation of the regenerative braking of the air compressor 300 and drive motor 400 is less than or equal to the chargeable amount of the battery 200.

Specifically, it is most ideal when the difference value between the sum (total power generation) of the power generation of the fuel cell stack 100 and the power generation of the regenerative braking of the air compressor 300 and drive motor 400, and the chargeable amount of the battery 200 becomes zero.

However, since it is impossible to calculate the speed of the air compressor 300 that makes the difference value of zero within a short moment, it is to find the speed of the air compressor 300 so that the sum (total power generation) of the power generation of the fuel cell stack 100 and the power generation of the regenerative braking of the air compressor 300 and drive motor 400 is close to the chargeable amount of the battery 200.

Meanwhile, in the case that the sum (total power generation) of the power generation of the fuel cell stack 100 and the power generation of the regenerative braking of the air compressor 300 and drive motor 400 is greater than the chargeable amount of the battery 200, since power greater than the chargeable amount of the battery 200 is received, overvoltage is applied to the main bus terminal 600 including the battery 200, which may adversely affect durability.

Therefore, the most appropriate target speed of the air compressor 300 is in the case that the sum (total power generation) of the power generation of the fuel cell stack 100 and the power generation of the regenerative braking of the air compressor 300 and drive motor 400 is less than the chargeable amount of the battery 200. Thus, the speed of the air compressor needs to be set to obtain this result.

That is, by setting the speed of the air compressor 300 so that the amount of energy becomes less than the chargeable amount of the battery 200, overvoltage is not applied to the main bus terminal 600, so that durability can be increased.

Meanwhile, the controller 500 sets the current speed of the air compressor 300 as an upper limit value, sets the maximum reduced speed after unit time as a lower limit value, calculates multiple index values existing between the upper limit value and the lower limit value, and selects one of the multiple index values as the speed of the air compressor 300, thereby controlling the operation of the air compressor 300.

(furthermore, it can be selected as the speed of the air compressor by including the upper limit value and the lower limit value in the multiple index values.)

Specifically, the multiple index values existing between the upper limit value and the lower limit value may be arbitrarily calculated, or may be calculated such that deviations of adjacent index values are the same. The number of the multiple index values can be arbitrarily set, and if the number of the multiple index values is too large, computation time is longer, and if the number of the multiple index values is too small, it is difficult to obtain an optimal value. Thus, it is desirable to calculate the appropriate number of index values through experiments.

For example, if the upper limit value is 10000 rpm, the lower limit value is 5000 rpm, the number of multiple index values is 5, and the deviation of adjacent index values is the same, the multiple index values are 9166.7, 8333.3, 7500, 6666.7, 5833.3 (deviation of 833.3).

The controller 500 may control the operation of the air compressor 300 by selecting one of the multiple index values as the speed of the air compressor 300, and it is preferable to select one value for which the sum of the power generation of the fuel cell stack 100 and the power generation of the regenerative braking of the air compressor 300 and drive motor 400 is smaller than the chargeable amount of the battery 200, among the five values, as the speed of the air compressor 300.

Meanwhile, the controller 500 calculates the multiple index values existing between the upper limit value and the lower limit value, calculates the sum of the power generation of the fuel cell stack 100 and the power generation of the regenerative braking of the air compressor 300 based on the multiple index values, corresponding to each of the multiple index values, obtains each total power generation by adding each summed value and the power generation of the regenerative braking of the drive motor 400, calculates the difference value between each total power generation and the chargeable amount of the battery 200, selects an index value at which the difference value has a value smaller than 0 and closest to 0, among the calculated difference values, as the speed of the air compressor 300, thereby controlling the operation of the air compressor 300.

Specifically, if the total power generation according to the index value selected among the multiple index values is smaller than the battery chargeable amount, the controller 500 may determine the selected index value as it is as the speed of the air compressor 300. However, in another embodiment, the controller 500 calculates the difference value between the total power generation and the chargeable amount of the battery 200 for all the multiple index values, and may select an index value that has a value smaller than 0 and closest to 0 as the speed of the air compressor 300.

That is, it is preferable that the controller 500 selects an index value such that the total power generation is smaller than the chargeable amount of the battery 200 as the speed of the air compressor 300, but most preferably the controller 500 may select the index value at which the total power generation is closest to the chargeable amount of the battery 200, among the multiple index values at which the total power generation is smaller than the chargeable amount of the battery 200.

According to the above embodiment, the possibility of overvoltage occurring in the main bus terminal 600 is low, and the recovery rate of energy generated by braking of the fuel cell vehicle may be the highest.

On the other hand, in selecting the most appropriate speed value of the air compressor 300, it is advantageous to have a large number of multiple s, but since the time required for computation increases, it is preferable to determine the appropriate number of index values through experiments.

Meanwhile, the controller 500 may correct the selected speed of the air compressor 300 if the difference value between the selected speed of the air compressor 300 and the current speed of the air compressor 300 exceeds a predetermined value.

Specifically, if the difference value between the selected speed of the air compressor 300 and the current speed of the air compressor 300 is excessive, an undershoot phenomenon in which the speed of the air compressor 300 is temporarily lowered than the selected speed of the air compressor 300 may occur despite the command of the controller 500. Thus, it is necessary to correct the selected speed of the air compressor 300 if the difference value between the selected speed of the air compressor 300 and the current speed of the air compressor 300 exceeds a predetermined value.

More specifically, the controller 500 may correct the selected speed of the air compressor 300 so that the selected speed of the air compressor 300 is close to the current speed of the air compressor 300 if the difference value between the selected speed of the air compressor 300 and the current speed of the air compressor 300 exceeds a predetermined value.

That is, in an embodiment in which the selected speed of the air compressor 300 is corrected to be close to the current speed of the air compressor 300, the selected speed of the air compressor 300 is multiplexed by a number larger than 1 to obtain a corrected speed of the air compressor 300.

Figure 4:
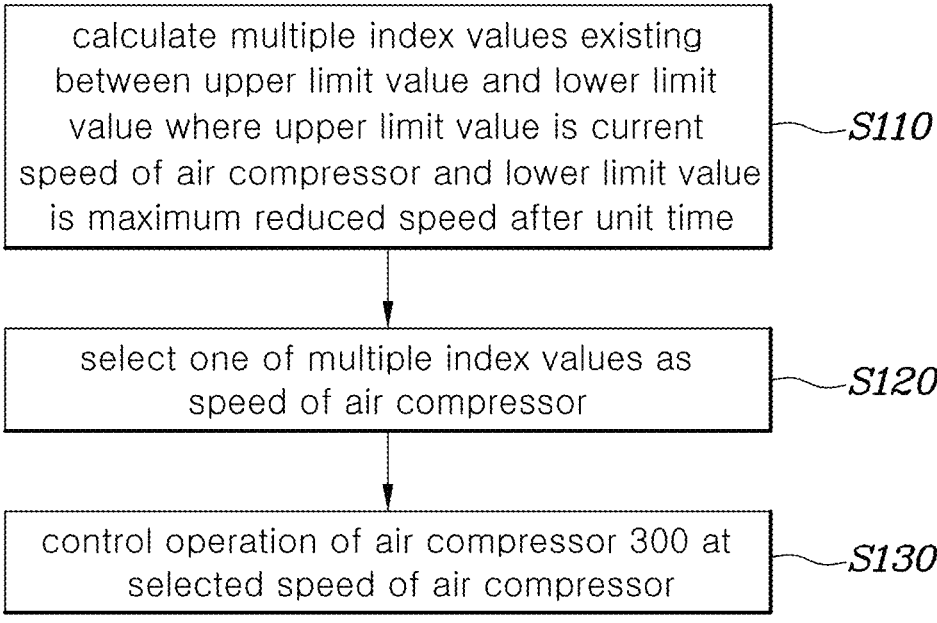

Meanwhile, FIGS. 3 to 5 are flowcharts of a method for controlling the fuel cell vehicle, and a method for controlling the fuel cell vehicle includes the step of controlling the operation of the air compressor 300 so that the sum of the power generation of the fuel cell stack 100 and the power generation of the regenerative braking of the air compressor 300 and drive motor 400 is close to the chargeable amount of the battery 200 (S100).

According to the method for controlling the fuel cell vehicle, high voltage is not generated at the main bus terminal 600 during braking of the fuel cell vehicle, so that the durability of the fuel cell vehicle can be improved and at the same time, the regenerative braking energy can be appropriately recovered. Accordingly, the fuel efficiency of the fuel cell vehicle can also be improved.

On the other hand, the step of controlling the operation of the air compressor 300 by the controller 500 (S100) includes the steps of calculating multiple index values existing between an upper limit value and a lower limit value wherein the upper limit value is the current speed of the air compressor 300 and the lower limit value is the maximum reduced speed after unit time (S110); selecting one of the multiple index values as the speed of the air compressor 300 (S120); and controlling the operation of the air compressor 300 at the selected speed of the air compressor 300 (S130).

As described above, the multiple index values may include the upper limit value and the lower limit value, and the controller 500 may select one of the multiple index values including the upper limit value and the lower limit value as the speed of the air compressor 300.

Meanwhile, the step of selecting one of the multiple index values as the speed of the air compressor 300 (S120) includes the steps of calculating the sum of the power generation of the fuel cell stack 100 and the power generation of the regenerative braking of the air compressor 300 based on the calculated multiple index values (S121); obtaining total power generation by adding the calculated value and the power generation of the regenerative braking of the drive motor 400 (S122); and selecting, as the speed of the air compressor, the index value at which the difference value between the total power generation and the chargeable amount of the battery is 0 or smaller than 0 (S123-1).

That is, as an embodiment, if any one of the multiple index values is selected and the difference value between the total power generation and the chargeable amount of the battery based on the selected value is 0 or smaller than 0, this value can be selected as the speed of the air compressor 300.

On the other hand, as another embodiment of the step of selecting one of the multiple index values as the speed of the air compressor (S120), the step of selecting one of the multiple index values as the speed of the air compressor 300 (S120) includes the steps of calculating the sum of the power generation of the fuel cell stack 100 and the power generation of the regenerative braking of the air compressor 300 based on the calculated multiple index values (S121); obtaining total power generation by adding the calculated value and the power generation of the regenerative braking of the drive motor 400 (S122); and selecting the index value at which the difference value between the total power generation and the chargeable amount of the battery 200 has a value closest to 0 as the speed of the air compressor if the difference value has multiple values smaller than 0 (S123-2).

That is, if the total power generation is smaller than the battery chargeable amount according to the index value selected from among the multiple index values as in one embodiment, the controller 500 may determine the selected index value as it is as the speed of the air compressor 300. In another embodiment, the controller 500 calculates the difference value between the total power generation and the chargeable amount of the battery 200 for all the multiple index values, and selects the index value at which the difference value is smaller than 0 and closest to 0 as the speed of the air compressor 300.

Although the disclosure has been shown and described with respect to specific exemplary embodiments, it will be obvious to those skilled in the art that the disclosure may be variously modified and altered without departing from the spirit and scope of the disclosure as defined by the following claims.

What is claimed is:

1. A fuel cell vehicle, comprising:
a fuel cell stack and a battery;
an air compressor that supplies air to the fuel cell stack and generates power during regenerative braking;
a drive motor that provides driving force to the fuel cell vehicle and generates power during the regenerative braking; and
a controller that controls operation of the air compressor so that a sum of power generation of the fuel cell stack and power generation of the regenerative braking of the air compressor and drive motor is close to a chargeable amount of the battery,
the controller controls the operation of the air compressor by calculating a target speed of the air compressor so that the sum of the power generation of the fuel cell stack and the power generation of the regenerative braking of the air compressor and drive motor is close to the chargeable amount of the battery,
wherein the controller calculates the target speed of the air compressor so that the sum of the power generation of the fuel cell stack and the power generation of the regenerative braking of the air compressor and drive motor is less than or equal to the chargeable amount of the battery.

2. The fuel cell vehicle of claim 1, wherein the controller controls the operation of the air compressor so that a difference value between the sum of the power generation of the fuel cell stack and the power generation of the regenerative braking of the air compressor and drive motor, with respect to the chargeable amount of the battery is smaller than 0.

3. A fuel cell vehicle, comprising:
a fuel cell stack and a battery;
an air compressor that supplies air to the fuel cell stack and generates power during regenerative braking;
a drive motor that provides driving force to the fuel cell vehicle and generates power during the regenerative braking; and
a controller that controls operation of the air compressor so that a sum of power generation of the fuel cell stack and power generation of the regenerative braking of the air compressor, wherein the drive motor is close to a chargeable amount of the battery, wherein the controller sets a current speed of the air compressor as an upper limit value, sets a maximum reduced speed after unit time as a lower limit value, calculates multiple index values that exist between the upper limit value and the lower limit value, and selects one of the multiple index values as a speed of the air compressor to control the operation of the air compressor,
wherein the controller calculates values by summing the power generation of the fuel cell stack and the power generation of the regenerative braking of the air compressor based on the multiple index values, each of the calculated values corresponding to each of the multiple index values, obtains each total power generation by adding the each of the calculated values and the power generation of the regenerative braking of the drive motor, calculates a difference value between the each total power generation and the chargeable amount of the battery, and selects the index value at which the difference value among the calculated difference values has a value smaller than 0 and closest to 0 as the speed of the air compressor to control the operation of the air compressor.

4. The fuel cell vehicle of claim 3, wherein the controller controls the operation of the air compressor by selecting one of the multiple index values including the upper limit value and the lower limit value as the speed of the air compressor.

5. The fuel cell vehicle of claim 3, wherein the controller corrects the selected speed of the air compressor if a difference value between the selected speed of the air compressor and a current speed of the air compressor exceeds a predetermined value.

6. The fuel cell vehicle of claim 5, wherein the controller corrects the selected speed of the air compressor so that the selected speed of the air compressor is close to the current speed of the air compressor.

7. The fuel cell vehicle of claim 3, wherein the controller calculates values by summing the power generation of the fuel cell stack and the power generation of the regenerative braking of the air compressor based on the calculated multiple index values, and adds the calculated values and the power generation of the regenerative braking of the drive motor to obtain total power generation, and selects the index value at which a difference value between the total power generation and the chargeable amount of the battery is 0 or smaller than 0 as the speed of the air compressor to control the operation of the air compressor.

8. The fuel cell vehicle of claim 7, wherein if multiple difference values between the total power generation and the chargeable amount of the battery are smaller than 0, the controller selects an index value at which a difference value among the multiple difference values is closest to 0 as the speed of the air compressor to control the operation of the air compressor.

9. A method for controlling a fuel cell vehicle including a fuel cell stack, a battery, an air compressor supplying air to the fuel cell stack and generating power during regenerative braking, a drive motor providing driving force to the fuel cell vehicle and generating power during the regenerative braking and a controller, comprising:
a step of controlling the operation of the air compressor by the controller so that the sum of the power generation of the fuel cell stack and the power generation of the regenerative braking of the air compressor and drive motor is close to a chargeable amount of the battery,
wherein the step of controlling the operation of the air compressor by the controller includes the steps of:

calculating multiple index values which exist between an upper limit value and a lower limit value wherein the upper limit value is a current speed of the air compressor, and the lower limit value is a maximum reduced speed after unit time;

selecting one of the multiple index values as a speed of the air compressor; and controlling the operation of the air compressor at selected speed of the air compressor, wherein the step of selecting one of the multiple index values as the speed of the air compressor includes the steps of:

calculating values by summing the power generation of the fuel cell stack and the power generation of the regenerative braking of the air compressor based on the calculated multiple index values;

obtaining total power generation by adding the calculated values and the power generation of the regenerative braking of the drive motor; and selecting the index value at which a difference value between the total power generation and the chargeable amount of the battery is 0 or smaller than 0 as the speed of the air compressor.

10. The method of claim 9, wherein the step of selecting one of the multiple index values as the speed of the air compressor includes the steps of:

calculating values by summing the power generation of the fuel cell stack and the power generation of the regenerative braking of the air compressor based on the calculated multiple index values;

obtaining total power generation by adding the calculated values and the power generation of the regenerative braking of the drive motor; and selecting the index value at which a difference value between the total power generation and the chargeable amount of the battery is closest to 0 as the speed of the air compressor if the difference value has multiple values smaller than 0.

* * * * *